United States Patent [19]

Lalouette et al.

[11] Patent Number: 5,433,397
[45] Date of Patent: Jul. 18, 1995

[54] HIGH SPEED TAPE TRANSPORT SYSTEM

[75] Inventors: Marc J. Lalouette, Fremont; Dennis C. Stark, Los Gatos; Kenneth A. Weza, San Jose; Peter D. Doninelli, Morgan Hill, all of Calif.

[73] Assignee: Xerox Corporation, Stamford, Conn.

[21] Appl. No.: 175,884

[22] Filed: Dec. 30, 1993

Related U.S. Application Data

[63] Continuation-in-part of Ser. No. 62, Jan. 4, 1993, abandoned.

[51] Int. Cl.$^6$ ............................................. G11B 15/00
[52] U.S. Cl. .................................. 242/340; 242/342; 242/349
[58] Field of Search ............... 242/340, 342, 345, 346, 242/349, 352, 352.1; 360/96.1, 96.3, 96.5; 226/97, 196

[56] References Cited

U.S. PATENT DOCUMENTS

| | | | |
|---|---|---|---|
| 3,869,099 | 3/1975 | Inaga | 242/340 X |
| 3,934,839 | 1/1976 | Serizawa . | |
| 3,967,790 | 7/1976 | Hess | 242/545.1 X |
| 4,234,140 | 11/1980 | Van Nie et al. | 242/345 X |
| 4,303,210 | 12/1981 | Fujita et al. | 242/340 X |
| 4,309,002 | 1/1982 | Saitou et al. | 242/340 |
| 4,427,166 | 1/1984 | Oishi et al. | 226/196 X |
| 4,436,256 | 3/1984 | Saitou | 242/340 |
| 4,466,582 | 8/1984 | Shiba | 226/196 X |
| 4,644,000 | 3/1987 | Shibaike et al. | 360/132 |
| 4,807,826 | 2/1989 | Iwahashi . | |
| 4,887,775 | 12/1989 | Kanaguchi et al. | 242/342 X |
| 5,173,830 | 12/1992 | Tanaka et al. | 242/345 |
| 5,183,219 | 2/1993 | Abeille et al. | 242/340 |
| 5,206,771 | 4/1993 | Katou et al. | 242/349 X |
| 5,299,754 | 4/1994 | Lackowski . | |
| 5,323,984 | 6/1994 | Lackowski | 242/349 X |

FOREIGN PATENT DOCUMENTS

| | | |
|---|---|---|
| 1099755 | 2/1961 | Germany . |
| 2441386 | 3/1975 | Germany . |

Primary Examiner—John P. Darling

[57] ABSTRACT

In a tape drive system, a cassette comprises a pair of spaced apart flangeless hubs and an access opening between the hubs. Each hub is provided with a cap of magnetically attractive material. Each hub receives a rotatable spindle which has a magnetic portion at its upper end. There are abutting surfaces on each hub and spindle which act as registration surfaces to provide a contiguous but non engaging relationship between the spindle magnetic portion and the hub cap of magnetically attractive material. The magnetic attraction between the magnetic portion of each spindle and its respective hub is the sole force urging each hub into engagement with its respective spindle. The abutting registration surfaces are located on each spindle relative to the bottom wall of the cassette so as to suspend its respective hub between the housing top and bottom walls. On each side of the access opening, there is mounted a cylindrical guide member which has a stationary flange at each end and a stationary central grooved portion between the flanges. The grooved surface comprises concave grooves providing a surface roughness average between 20 and 40 microinches. Each of said hubs has a tape engagement portion which has a tape center line axially located at the center thereof and each of the guide members has a tape center line axially located thereon at the center of said grooved central portion. When connected to a tape drive, the tape center line of each of the guide members and the hubs are substantially aligned with each other in the same plane. The tape extends in a tape transport path from one hub directly to and engaging the grooved central portion of one guide member and across the access opening directly to and engaging the grooved central portion of the other guide member and directly to the other hub. The guide members are the sole members in the cassette engaged by the tape in the tape transport path between said hubs.

5 Claims, 6 Drawing Sheets

HIGH SPEED TAPE TRANSPORT SYSTEM

This application is a Continuation-in-part of U.S. application Ser. No. 08/000,062, Magnetic Hub Hold Down For Cartridge Hubs, filed on Jan. 4, 1993, now abandoned, and of which Marc J. Lalouette, Dennis C. Stark, Kenneth A. Weza, and Peter D. Doninelli are the inventors.

This application relates to U.S. application Ser. No. 08/175,887, Tape Drive and Cassette with Precise Registration, filed on Dec. 30, 1993, with the inventors being Marc J. Lalouette, Dennis C. Stark, Kenneth A. Weza, and Peter D. Doninelli, and U.S. application Ser. No. 08/175,885, High Speed tape Transport Cassette, filed on Dec. 30, 1993, with the inventor being Peter D. Doninelli. Each of the applications are commonly owned.

BACKGROUND

This invention relates to a high speed tape transport digital audio tape (DAT) cassette for carrier tape, such as magnetic recording tape and optical recording tape.

In a cassette tape system, the speed at which the tape may advance is limited by various factors including the need for the tape to form a proper pack on the take-up hub or reel. In particular a concern is uneven tape height on the pack, which can cause data errors during low speed reading of the tape, and catastrophic telescoping of the pack during high speed winding. Different mechanisms have been proposed to produce a proper pack, but these methods have limited the speed at which the tape can travel without producing unnecessary and premature wear on the tape and affecting reliability of the system. Some mechanisms that have produced high tape speeds have been complex and costly. Therefore, there is a need for a simple, yet effective, mechanisms for achieving a high speed tape transport system.

SUMMARY OF THE INVENTION

The present invention relates to a high speed tape transport system. The system is designed such that a minimum amount of friction is imposed on the tape and on the hubs during rotation.

In one aspect of the present invention, a cassette comprises a pair of spaced apart flangeless hubs and an access opening between the hubs. The provision of flangeless hubs eliminates the frictional contact between the tape and the flanges on the hubs during transport of the tape from one hub to the other. Each hub is provided with a cap of magnetically attractive material and each hub is loosely mounted in the cassette for free axial movement between the top and bottom walls of the cassette. Each hub receives a rotatable spindle which has a magnetic portion at its upper end.

Abutting surfaces are provided on each hub and its respective spindle for stabilizing the lower end of the hub against wobble when each hub and its respective spindle are rotating. There are also abutting surfaces on each hub and spindle which act as registration surfaces to provide a contiguous but non engaging relationship between the spindle magnetic portion and the hub cap of magnetically attractive material. The power of the magnetic portion of each spindle is strong enough to attract the magnetically attractive cap of its respective hub toward the spindle and hold said hub against its spindle during high speed rotation and yet permit removal of a hub from its respective spindle without substantially jarring the hub. The magnetic attraction between the magnetic portion of each spindle and its respective hub is the sole force urging each hub into engagement with its respective spindle. Therefore, there is no resilient member urging the hub into engagement with the spindle which causes frictional contact during rotation.

The abutting registration surfaces are located on each spindle relative to the bottom wall of the cassette so as to suspend its respective hub between the housing top and bottom walls. This provides clearance between the top and bottom walls and the hubs and the tape which eliminates frictional contact between both the hub and tape and the top and bottom walls.

In accordance with another aspect of the invention, a further aid to reducing friction during tape transport is accomplished by providing a cylindrical guide member on each side of the access opening. Each cylindrical guide member has a stationary flange at each end and a stationary central grooved portion between the flanges. The grooved surface comprises concave grooves extending in a direction transverse to the axis of the guide and providing a surface roughness average between 20 and 40 microinches. The tape extends in a tape transport path from one hub directly to and engaging the grooved central portion of one guide member and across the access opening directly to and engaging the grooved central portion of the other guide member and directly to the other hub. The guide members are the sole members in the cassette engaged by the tape in the tape transport path between said hubs. The construction of the guide members eliminates a substantial amount of friction between the guide members and the tape during transport and also provides an air bearing.

DETAILED DESCRIPTION OF THE PREFERRED EMBODIMENTS

Figure 1:
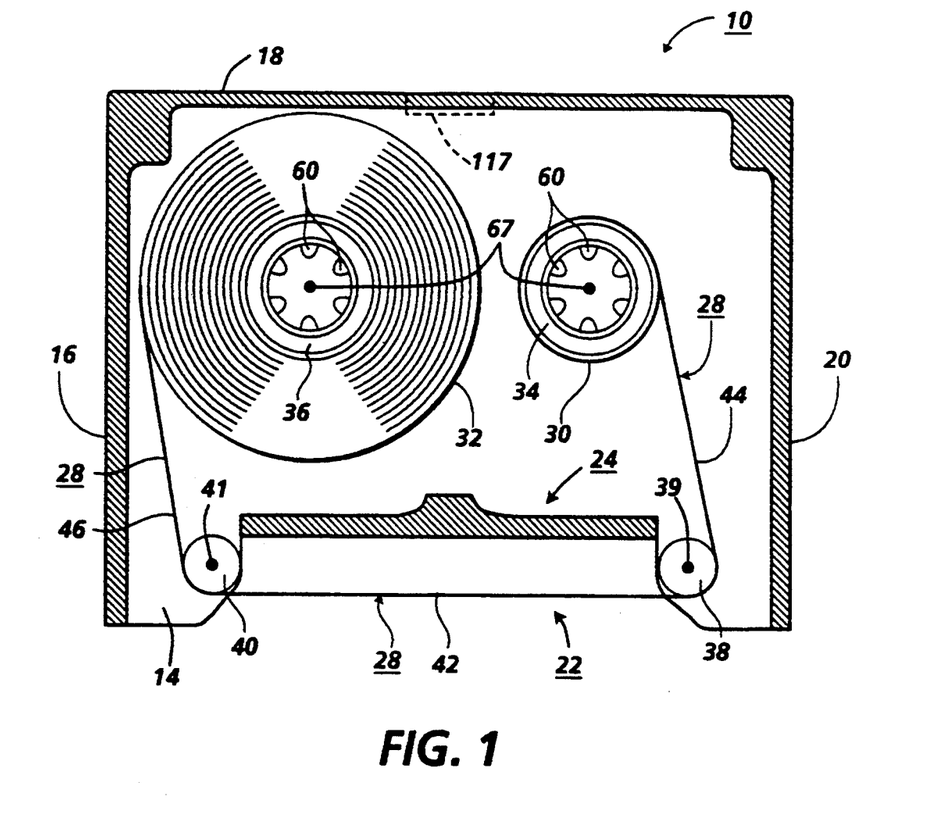
FIG. 1 is a plan cutaway view of a cartridge embodying the present invention.
Figure 2:
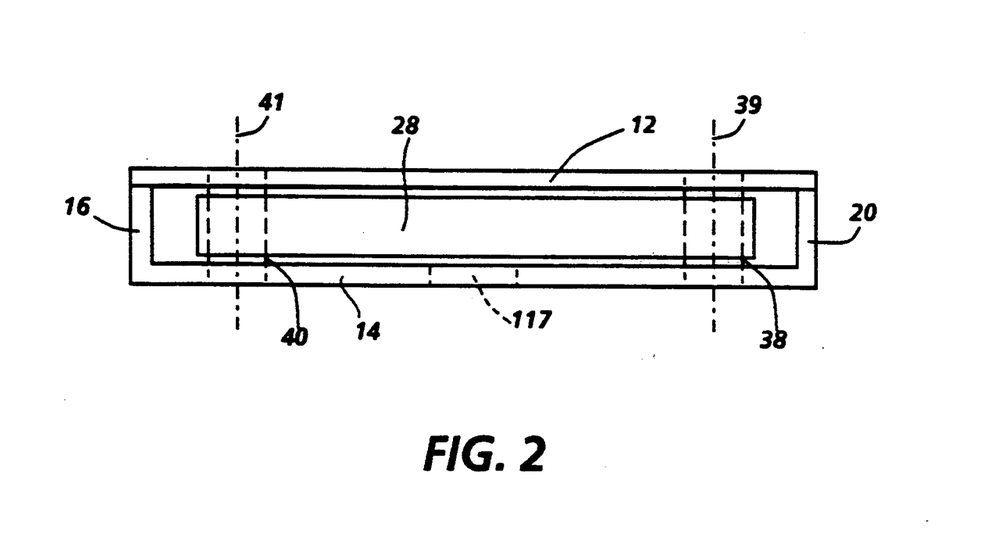
FIG. 2 is a front view of the cartridge of FIG. 1.

Referring now to FIGS. 1 and 2, there is shown a cassette tape cartridge housing 10 embodying the present invention. Cartridge housing 10 is substantially rectangular and has top and bottom walls 12 and 14, respectively. In FIG. 1, the housing 10 is shown with the top wall 12 removed. Connected between the top and bottom walls 12 and 14 are three side walls 16, 18, and 20. Along a fourth side of the housing 10 is an opening 22 that can be enclosed by a movable lid (not shown). To the rear of the opening 22 is a support wall 24. Opening 22 gives access to the interior of housing 10. A supply of tape 28 is contained in the cartridge housing 10. Tape 28 is wound in packs 30 and 32 on identical respective rotatable supply and take-up flangeless hubs 34 and 36. Pack 32 is at its maximum diameter, while pack 30 is at its minimum diameter.

A pair of guide posts 38 and 40 extend between the top and bottom walls 12 and 14 at the corners of housing 10 which are at the opposite ends of and adjacent to the opening 22. Guides 38 and 40, having an axis 39 and 41, respectively, guide tape 28 between hubs 34 and 36 in a span 42 extending along the opening 22 of housing 10. Access to tape 28 in span 42 is achieved by raising the lid (not shown), after which a loop of tape 28 can be extracted from housing 10, or a recording or reading transducer (not shown) can be inserted into opening 22 to engage tape 28. Between guide 38 and pack 30 is a span 44 of tape 28. Guide 38 guides tape span 44 on to and off of pack 30. Between guide 40 and pack 32 is a span 46 of tape 28. Guide 40 guides tape span 46 on to and off of pack 32.

Figure 3:
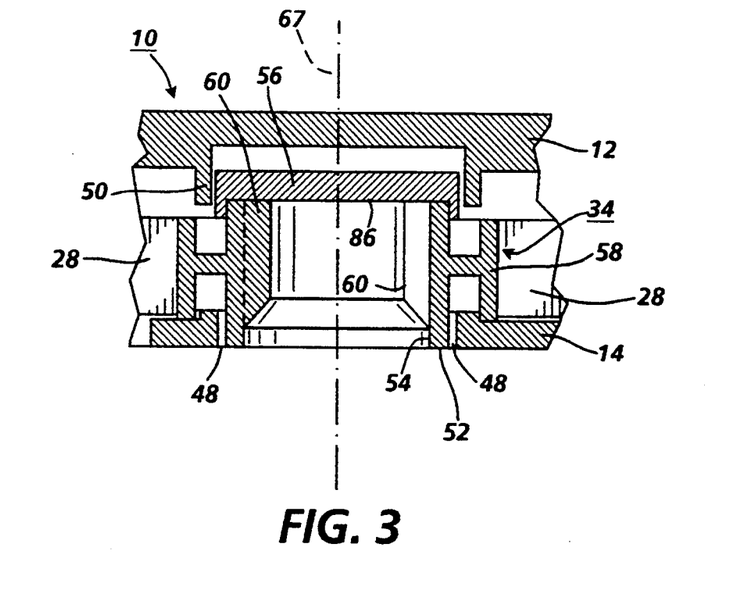
FIG. 3 is a front section view of one hub of the cartridge of FIG. 1.

Referring to FIG. 3, only one hub 34 is shown with the description of hub 34 and its associated portion of the cartridge housing 10 and spindle structure also applying to identical hub 36 and its associated cartridge housing and spindle structure. Hub 34 is rotatably retained in the housing 10 at its lower end by a circular opening 48 provided in the bottom wall 14 of housing 10. At its upper end, hub 34 is kept in the confines of housing 10 by a circular retainer 50 that is integral with top wall 12 of housing 10. At the lower end of the hub 34 is a precisely constructed downwardly facing (in the axial direction) annular bottom edge 52 for a purpose to be explained hereinafter. Also at the lower end of the hub 34 is a precisely constructed inner annular axially extending bearing surface 54 for a purpose to be explained hereinafter. The surface 54 is constructed against the edge 52 to simplify the task of precisely constructing the edge 52 and inner surface 54. At the upper end of the hub 34 is a generally circular cap 56 which is made of magnetically attractive material for a purpose to be explained hereinafter. An annular flange 58 extends radially from the hub 34. Tape 28 is wound around the flange 58 to form the pack 30 (FIG. 1). The inner surface of the hub 34 is formed with a plurality of circumferentially spaced apart, axially extending projections or splines 60 for rotatably coupling of the hub 34 with a respective drive shaft or spindle 62 (FIG. 4) of a tape recording or reproducing device.

Figure 4:
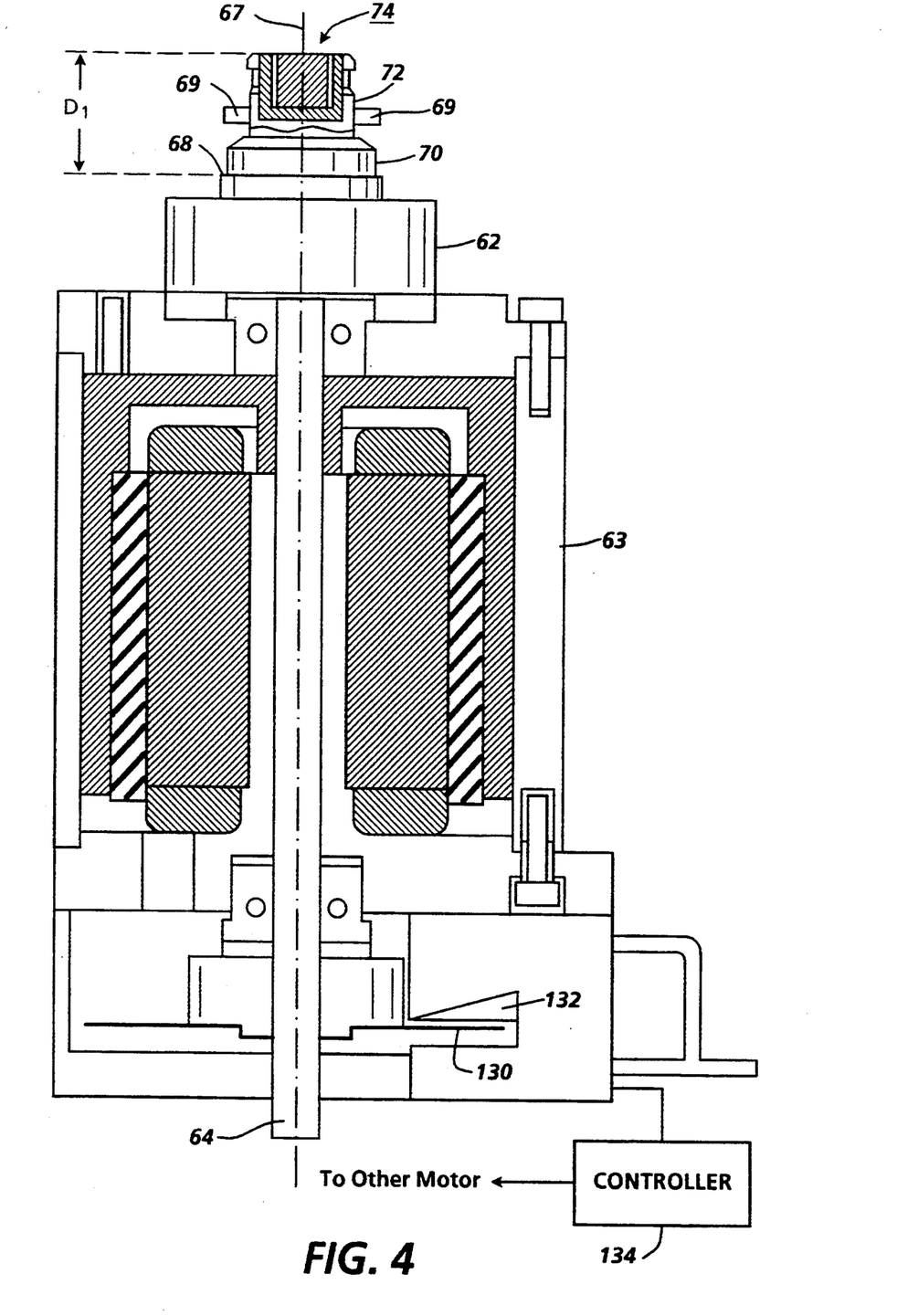
FIG. 4 is a view of a motor and spindle, for engagement with the hub illustrated in FIG. 3, and a schematic diagram of a tape tension control scheme.

Referring to FIG. 4, the tape recording or reproducing device includes a direct drive motor 63 having a drive shaft 64 that has formed thereon the spindle 62 at its upper end. The spindle rotates about an axis of rotation 67. A pair of drive protrusions 69 extend from the spindle 62 for engaging the splines 60. The spindle has a precisely constructed upwardly facing (in the axial direction) annular edge 68 and is constructed to be axially aligned with the annular bottom edge 52 of the hub for precise engagement therewith. The spindle also has a precisely constructed outer annular side surface 70 extending upwardly from the annular edge 68 for precise engagement with the precisely constructed inner annular bearing surface 54 of the hub 34. The surface 70 is constructed against the edge 68 to simplify the task of precisely constructing the edge 68 and outer surface 70. At the upper end 72 of the spindle 62 is a magnet assembly 74 for coacting with the cap 56 to hold the hub 34 in engagement with the spindle.

A fixture 88 (see FIG. 7), replicating a drive, is provided for fixing the axial location of the annular edge 68 on the spindle 62 and for aligning the axis of rotation 67 to be precisely parallel (within close tolerances) with the axes 39 and 40 of the guides 38 and 40. The annular edge 68 is cut while on the fixture 88 with its reference being reference plane RP. The axis of rotation 67 of the spindle 62 is set to be perpendicular to the reference plane RP. Each hub 34 and 36 has a tape transport center line TCL that passes midway of the axial length of the flange 58 which is located a distance $D_{TCL}$ from the reference plane RP. The spindle annular edge 68 is located on the spindle relative to the reference plane RP such that when it engages the hub in the drive position, the tape center line TCL of the hubs will be a distance $D_{TCL}$ from the reference plane RP and be aligned in the same plane with tape center lines TCL of the guide posts 38 and 40 (see FIG. 8)

Figure 6:
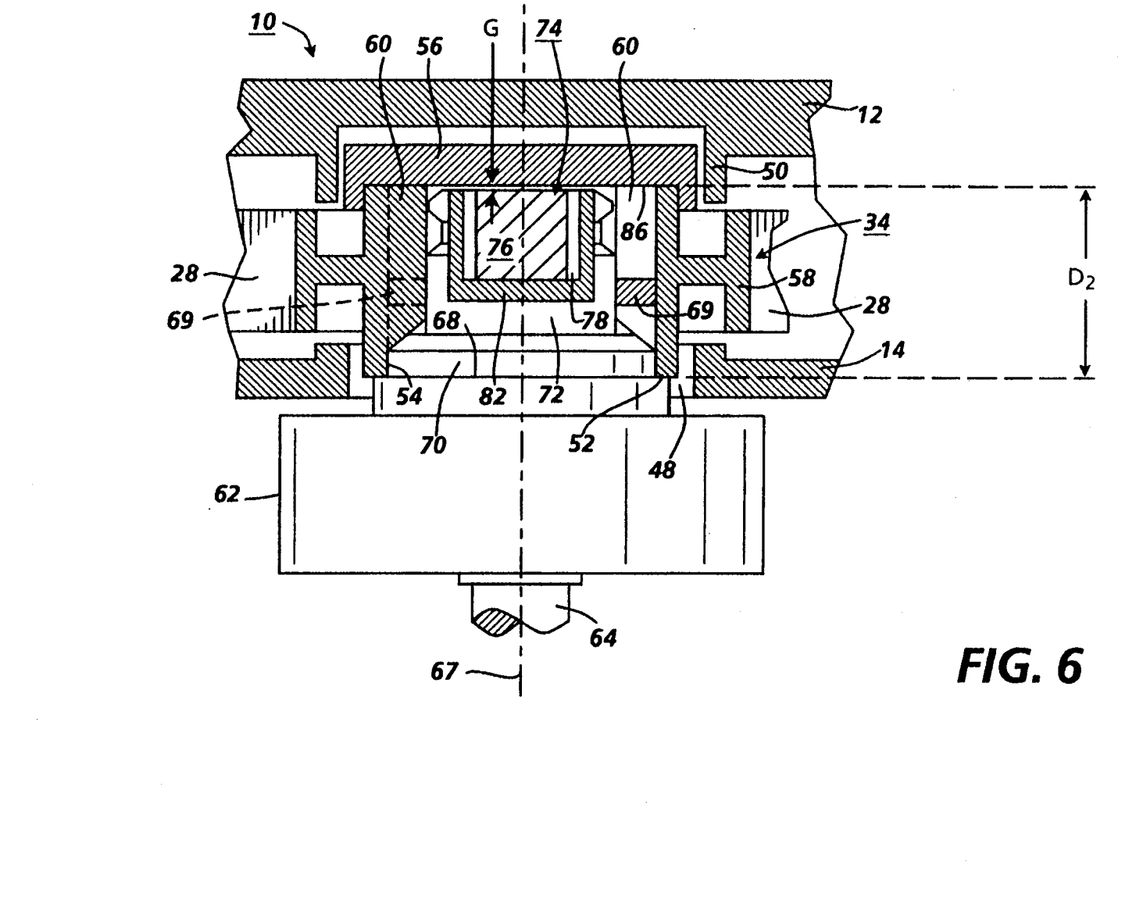
FIG. 6 is a front section view of the hub of the cartridge of FIG. 3 shown in engagement with the spindle of FIG. 4.

Furthermore, when the position of the hub edge 52 with spindle edge 68 prevents hub flange 58, or any other portion of hub 34 and tape 28, from contacting the bottom wall 14 or top wall 12 of housing 10, or from contacting any liner (not shown) that may be positioned between the top and bottom walls 12 and 14 and hub 34. For instance, when the hub is in the position illustrated in FIG. 3, there will be approximately a clearance of 0.040 inch between the bottom of circular retainer 50 and the top of flange 58. When the hub is raised from the position in FIG. 3 to the tape transport position by the spindle as shown in FIG. 6, there will be a clearance of about 0.020 inch between the bottom wall 14 surface and the bottom of the flange 58 and a clearance of about 0.020 inch between the bottom of circular retainer 50 and the top of the flange 58.

Figure 5:
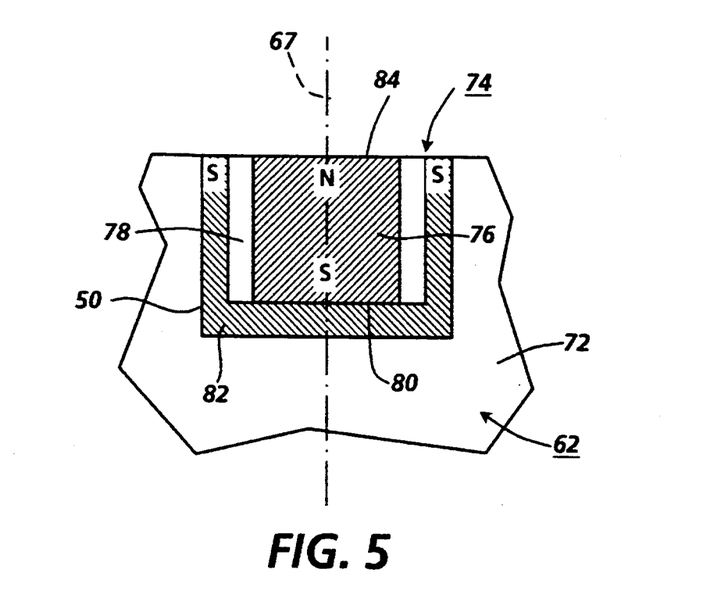
FIG. 5 is an enlarged view of a magnet section of the spindle of FIG. 4.

Referring to FIG. 5, the magnet assembly 74 is shown in more detail. Designs for the magnet assembly 74 having a confined magnetic field are well known to those skilled in the art. In particular, magnet assembly 74 includes a magnet 76. Preferably magnet 76 is a permanent magnet made of a strong magnetic material, such as neodimium-iron boron or samarium-cobalt. Preferably magnet 76 is cylindrical in shape, and axially aligned and symmetrical with the axis of rotation 67.

The magnet 76 is surrounded by an insulating shell 78, which preferably consists of an air gap or can be aluminum, epoxy, plastic, or some other nonmagnetic material. Like magnet 76, shell 78 is axially aligned and symmetrical with the axis of rotation 67. The bottom surface 80 of magnet contacts a magnetic shell 82 that surrounds insulating shell 78. Magnetic shell 82 preferably consists of a ferromagnetic material or other material capable of conveying magnetic flux. Shell 82 is also axially aligned and symmetrical with axis of rotation 67.

The distance $D_1$ (FIG. 4) between the precisely constructed edge 68 on the spindle 62 and the top surface 84 of the magnet 76 is less than the distance $D_2$ (FIG. 6) between the precisely constructed edge 52 of the hub 34 and the bottom surface 86 of the cap 56. This will provide for the bottom surface 86 of the cap 56 being spaced by an air gap G (FIG. 6) from the top surface 84 of the magnet 76 when the spindle 56 is inserted into the hub 34.

Referring to FIG. 6, when the tape cartridge 10 is in operating position on a drive, the upper portion 72 of the spindle 62 will be inserted into the hub 34. The magnet assembly 74 magnetically attracts adjacent hub cap 56, and hence hub 34, onto spindle 62 with a force sufficient to prevent hub 34 from moving away from spindle 62 in a linear direction along the axis of rotation 67 of hub 34 and spindle 62. The distances $D_1$ and $D_2$ on the spindle 62 and the hub 34, respectively are designed that magnet assembly 74 is contiguous to, but not in contact with, hub cap 56. This provides for an inexpensive holdown since with this construction, cartridge 10 can be removed from spindles 62 without jarring to hub 34, and hence to pack 30, that could occur were magnet assembly 74 in contact with hub cap 56, and that contact was broken. In the latter construction, a spring is usually provided which acts in a manner to urge the hub away from the magnet, once the contact is broken. The distances $D_1$ and $D_2$ on the spindle 62 and the hub 34, respectively are further designed that the gap G between the hub cap 56 and the magnet assembly 74 is such that the size and power needed for magnet assembly 74 to reliably attract hub cap 56 is minimized. The gap G will generally be around 0.016 inch.

The housing 10 is designed with enough clearance between hub 34 and attached hub cap 56 and the surrounding bottom wall 14 and top wall 12 such that spindle edge 68 can engage hub edge 52 and lift hub 34 away from bottom wall 14 (and any liner), while magnet assembly 74 attracts hub cap 56, and hence hub 34, away from the top wall 12. In this manner, hub 34 is held in relatively precise vertical orientation with its tape center line TCL aligned in the same plane as the tape center line TCL of the guide posts 38 and 40 (see FIG. 8) and the rotational axis of the hub being coincident with the rotational axis 67 of the spindle 62.

The magnetic attraction between magnet assembly 74 and hub cap 56 does more than just prevent hub 34 from moving away from spindle 62. The attraction acts to reduce any tendency of hub 34 to wobble. As hub 34 starts to wobble (perhaps due to a sudden increase or decrease in tension on tape 28 wound in the pack 30 on hub 34), hub 34 would tend to deviate from its plane of rotation, a plane that should be perpendicular to axis of rotation 67. However, any deviation of hub 34 would cause hub cap 56 to tilt on rotation axis 67, a motion which would be opposed by the magnetic force attracting hub cap 56 to magnet assembly 74. When the spindle 62 is inserted into hub 34, there is engagement of the inner annular hub surface 54 with the outer annular spindle surface 70. This engagement also provides resistance to or counters wobble of the hub 34 on the spindle 62.

Since the hub 34, hub cap 56, magnet assembly 74 and spindle 62 are all circular and aligned with the axis of rotation 67, they are of a shape and orientation which facilitates the hub 34, spindle 62 assembly to rotate at high speeds.

The magnet assembly 74 is constructed so that the magnetic field generated by assembly 74 is confined to the immediate vicinity of the magnet 76, magnetic shell 82 and hub cap 56, reducing the likelihood of the magnetic field disturbing the magnetic domains on tape 28 and thereby induce errors in data stored on magnetic tape 28. Of course, the magnetic field would not generate errors to present types of optical tape 28.

Although generally cylindrical shapes are shown for magnet 76, insulating shell 78, magnetic shell 82 and hub cap 56, other shapes are possible. The cylindrical shape has the advantage of being relatively easy to design and manufacture. In particular, cylindrical magnets 76 are available, "off-the-shelf," in many materials and dimensions. However, it would be well known to one skilled in the art to alter the shapes to create a design better able to attract hub cap 56 and hub 34 to magnet assembly 74, yet not adversely impact any data on magnetic tape 28 as well as speed of the hub, spindle assembly.

Figure 8:
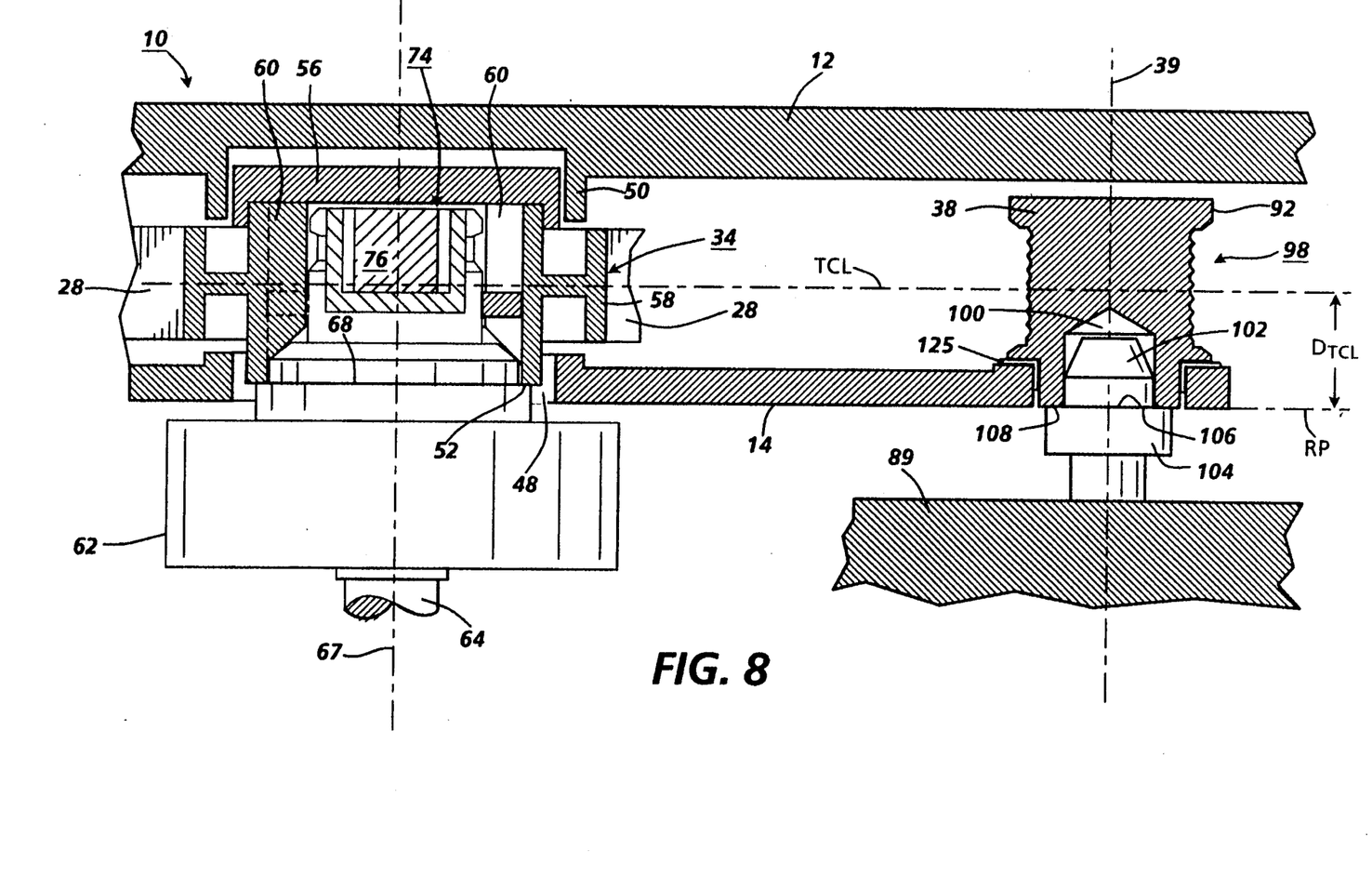
FIG. 8 is a partial cross-sectional side view of the cartridge positioned on a tape drive.

Referring now to FIG. 8, the configuration of identical guides 38 and 40 is disclosed in greater detail. The guides 38, 40 are each a one piece metal member having an upper stationary flange 92 and a lower stationary flange 94 that are placed close enough to each other to allow little vertical movement of tape 28 between the flanges 92 and 94. Each of the flanges 92 and 94 has a sloped tape lead in edge 93 for guiding the tape into a position between the flanges. The guides 38, 40 are each stationary. With stationary flanges 92 and 94, any contact between a flange 92 or 94 and an edge of tape 28 will only act to push the tape 28 vertically and to impart drag on the tape 28 in a direction opposite to the direction of the motion of the tape 28. In contrast, were flanges 92 and 94 allowed to rotate, the turning of a flanges would act to pull the tape 28 edge along with the turning flange, in a horizontal direction perpendicular to the direction of tape 28 motion, thereby distorting the edge.

Preferably for a standard width digital audio tape (DAT) (e.g., the DAT standard is 0.1500+0.0000 and −0.0008 inches in width, while the de facto industry standard is 0.1498±0.0002 inches), the distance $D_3$ between the flanges 92 and 94 are machined to within 0.0002 inch of the width of tape 28. Preferably each flange 92 and 94 has either sharp corners 95 or very little corner relief (e.g., corner relief of 0.004 inch is excessive). This configuration of guides 38, 40 does cause some coining of the edges of tape 28.

Preferably the diameter and height of each guide 38 and 40 and other components of cartridge 10 conform to the DAT standard, herein incorporated by reference, so that cartridge 10 can be used with standard DAT devices (not shown).

The middle portion 96 of guides 38, 40 between flanges 92, 94 is stationary and is a grooved surface consisting of a long helical concave groove 98. The helical groove is cut with a single point tool and provides a surface roughness average in the middle portion of guides 38, 40 that is between 20 and 40 microinches. The grooved portion can also be a plurality of axially spaced circular concave grooves with a surface roughness average between 20 and 40 microinches. The helical groove is preferred. Hereinafter, when referring to both a helical groove and spaced circular grooves, the term grooves will be used to apply to both types of grooves since even though a helical groove is one long groove, for practical purposes a helical groove is a plurality of grooves which are adjacent to and spaced each other and spaced from each other along the axis of the guide member.

Figure 7:
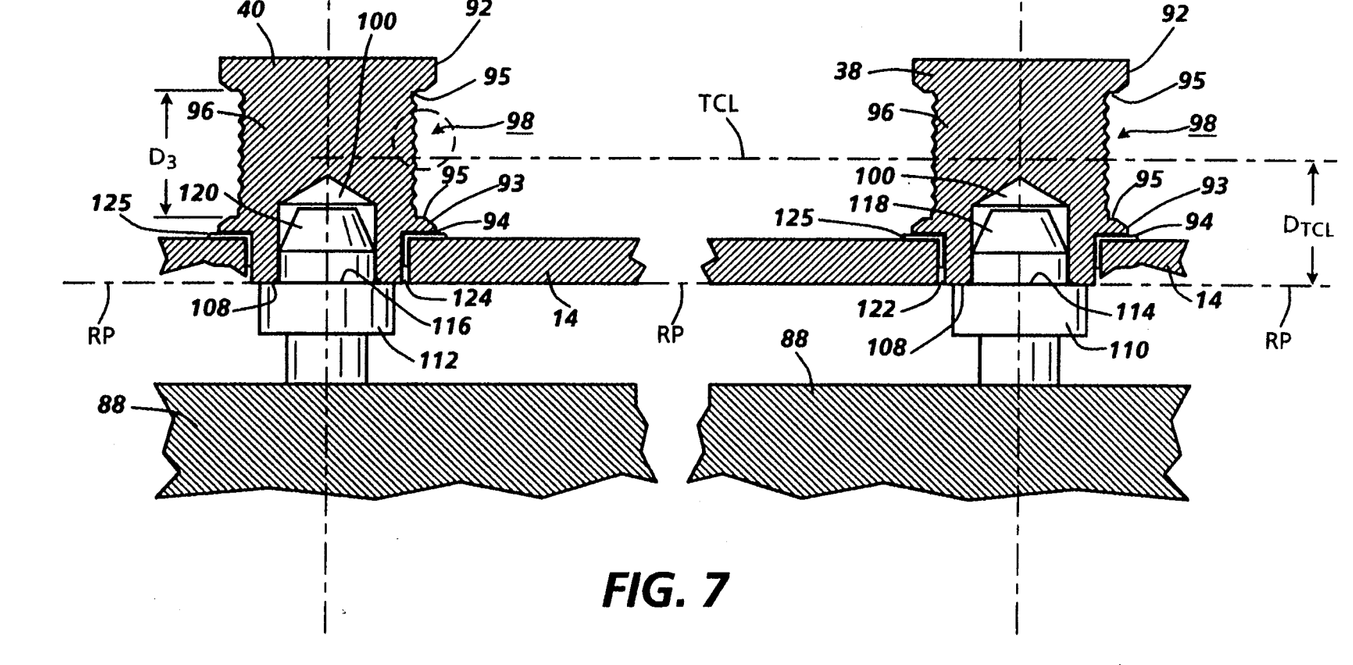
FIG. 7 is a view of two guide posts being attached to the bottom wall of the cartridge.
Figure 7A:
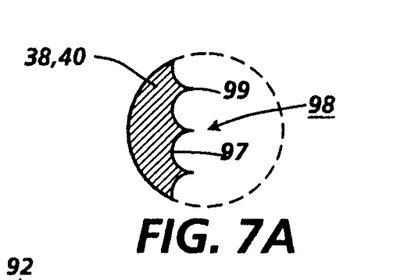
FIG. 7A is an enlarged view of a grooved portion of a guide post illustrated in FIG. 7.

The depth of the concave grooves is in a general range between 40 and 100 microinches and the pitch is in a general range between 40 and 320 microinches. Referring to FIG. 7A, the concave grooved surface 97 can be defined as rounded grooves or valleys with generally sharp peaks 99 between the grooves 97 as contrasted to a groove which is a sharp V-shaped groove or valley with rounded convex mountain tops between the grooves. In essence, the concave grooves with rounded valleys with generally sharp peaks between the grooves provide a surface which has substantially more air exposure and less metal surface than sharp V-shaped grooves with rounded convex mountain tops between the grooves. This surface profile will provide a good air bearing effect during tape transport allowing tape 28 to glide over middle portion 96 on a layer of friction-reducing air.

The traditional approach would be to use a middle portion that rotates. Using a rotating middle portion would reduce wear on the back surface of tape 28. However, experiments have shown that using a stationary middle portion 96, rather than a rotating portion, aids tracking of tape 28 (and hence aids the building of even packs 30, 32), provided, that is, proper attention is paid to the surface profile of middle portion 96 as set forth above. Experimental data have shown that at relatively high tape 28 speeds (i.e., tape 28 speeds in excess of 200 ips) the best tracking results occur when the surface profile of the middle portion 96 has concave grooves 98 as defined above that provide a surface roughness average between 20 and 40 microinches.

The lower ends of the guide posts 38, 40 each have a positioning opening 100 for receiving a positioning protrusion 102 of drive 89 therein. The protrusion 102 is secured to the upper part of a registration post 104 and extends from an annular registration and support surface 106 which extends in a plane perpendicular to the axis of the protrusion 102. The plane of surface 106 is wholly within the reference plane RF of the drive. The annular registration and support surface 106 is slightly smaller in diameter than an annular registration surface 108 on each guide 38, 40 surrounding its respective opening 100 so the annular registration and support surface 106 will engage only the guide post registration surface 108 for a reason to be explained hereinafter.

The fixture 88 comprises two registration posts 110 and 112 each having an annular registration surface 114 and 116, respectively, with protrusions 118 and 120 extending from a respective surface 114, 116. The annular registration surfaces 114 and 116 are each wholly in the reference plane RP. The axis of the protrusions are perpendicular to the plane of the registration surfaces 114 and 116. The fixture 88 has a third point of registration (not shown) for planar referencing with registration surfaces 114 and 116. The bottom wall 14 of the cassette 10 is partially supported by a member (not shown) of the fixture adjacent to the registration posts, but which is separate from the registration posts 110 and 112 and the bottom wall is also supported on by the third point of registration. A pad 117 (FIG. 2), extends from the bottom surface of center of the rear of the bottom wall 14 which engages the third point of registration. The bottom wall 14 is supported so that its lower surface is generally in the plane of the reference plane RP. The bottom wall 14 has two openings 122 and 124 for receiving the lower end of a respective guide post 38 and 40 therethrough. The openings 122 and 124 are slightly larger than the guide annular surface 108 and the axial length between the guide registration surface 108 and the bottom surface of the flange 94 is slightly greater than the thickness of the the bottom wall 14 to permit relative movement between the guides 38 and 40 and the bottom wall 14 during assembly.

The guide posts are positioned onto the bottom wall 14 of the cassette 10 in the following manner. A highly viscous epoxy resin 125 is applied to the bottom surface of the flange 94 of the guide posts 38 and 40 and then the guide posts are positioned over the protrusions 118 and 120, respectively, and then lowered into the openings 122 and 124 of the bottom wall 14 and guide registration surfaces 108 engage the fixture registration surfaces 114 and 116 so that the axis 39 and 41 of the guides are perpendicular to the reference plane RP. At the same time, the guide members are spun to spread the epoxy into the space between each guide member and the upper surface of the bottom wall 14 and inside the openings 122 and 124 and allowed to cure when the guides are in their proper position. In this manner, since the axis 39 and 41 of the guides and the axis 67 of the spindles have been set to be perpendicular to the same reference plane RP, these four axes will be parallel to each other within close tolerances. This is a very important factor contributing to a high speed tape transport system. Furthermore, in addition to the tolerance of the guide itself, only the tolerance between the guide registration surface 108 and the fixture registration surfaces 114 and 116 is involved in affecting the distance $D_{TCL}$ between the reference plane and the tape center line TCL of each guide post 38 and 40 which is midway in the axial direction between the flanges 92 and 94 ($\frac{1}{2}$ of $D_3$).

The bond between the guide posts 38 and 40 and the cassette bottom wall 14 by the epoxy resin is sufficient to withstand all of the forces exerted on the guide posts during tape transport. Therefore, the upper portion of each guide post 38 and 40 is left floating and is not connected to the upper wall 12 of the cassette 10 in order to avoid affecting the set aligned axes of the guide posts.

Referring to FIG. 8, the tape cassette 10 is shown mounted on the tape drive 89. Only half of the cassette is shown since the relationship of the cartridge to the drive by the other half is exactly the same. The drive is essentially a replica of the fixture 88 with the registration post 104 and its protrusion 102 and its annular registration and support surface 106 being replicas of the registration posts 110,112 and their protrusions 118, 120 and their annular registration surfaces 114, 116 of the fixture 88. As stated previously, the lower end surface 108 of the guide post member 38 is supported on the registration and support surface 106 of the registration post 104. Likewise, the lower end surface 108 of the guide post member 40 is supported on registration and support surface of its respective registration post. The drive has a third support surface (not Shown) which is a replica of the third point of reference of the fixture. The pad 117 of the cassette bottom wall 14 engages this third support surface and thereby a third support point is provided for the cassette 10.

The annular registration and support surface 106 engaged by the bottom surface 108 of the guide post member 38 and the annular registration and support surface engaged by the bottom surface 108 of the guide post member 40 and the third support surface engaged by the pad 117 all lie in the same reference plane RP that was the reference plane on the fixture. Therefore the distance $D_{TCL}$ from the reference plane RP will be the same for the guide posts 38 and 40 and for the hubs 34 and 36 thereby positioning the tape center line for each in the same plane. This is very important since if the tape center line for each of the guide posts and the hubs is misaligned, the tape will not wind in a proper manner and will tend to ride off the hub and either twist or cause edge damage. This is another very important factor contributing to a high speed tape transport system.

Proper tension of the tape 28 must be maintained. The tension will depend upon the tape material and the thickness of the tape 28 and is well known to those skilled in the art. Mechanisms for maintaining tape 28 tension are well known to those skilled in the art. In brief, one approach is illustrated in FIG. 4. In FIG. 4 there is shown one of the two direct drive electric motors 63 having an encoded wheel 130 having periodic marks (not shown) (e.g., a gray scale pattern or other suitable pattern of marks well known to one skilled in the art) inscribed on the outer end. As shaft 64 rotates, marks pass by a sensor 132, which detects the passage of marks and passes this information as electrical signals to controller 134, where the information is interpreted as the position of spindle 62. Similarly, controller 134 receives electrical signals from the sensor 132 associated with the other motor and interprets the information to determine the position of the other spindle. Controller 134 controls both motors in response to signals received from the sensors 132 for both motors and the known length of tape 28.

In the system in which the cartridge 10 is used, searching for files is conducted with the tape withdrawn from a reading or recording transducer (not shown) and the tape is entirely within the cartridge in contact only with the guides 38 and 40 between the packs 30 and 32. When searching, the current position of the tape is known and the approximate position on the tape of the file desired is known. The tape is then forwarded or reversed at very high speeds to a position just prior to the position of the file desired and then the tape is slowed down and withdrawn from the cartridge and engaged with the reading head to read the headers until the desired file is found. It is important that the files be found as fast as possible and therefore the construction of the elements within the Cartridge housing 10 should be designed as much as possible for very high tape transport speeds.

The magnetic hold down connection between the hub 34 and the spindle 62 and the lateral support between inner surface 54 of the hub 34 and the outer surface 70 of the spindle 62 aids in providing hub rotation at high speeds. Wobbling of the hub is at a minimum allowing the hubs 34 and 36 to rotate at higher speeds and the packs 30 and 32 to form properly. To constrain the axial movement of a hub, many cassettes hold the hubs of the cassettes towards the spindles that engage the hubs. To do this, the cartridges include a bias spring, such as a leaf spring, having one end connected to the cassette housing and the other end rotatably contacting a cap on the hub, such that the spring biases the hub towards the spindle. While this approach performs adequately at relatively low speeds, at higher speeds the friction between the leaf spring and the cap can impart undesirable vibrations, high frictional force and create debris, all of which is eliminated by the magnetic hold down connection between the hub 34 and the spindle 62. Moreover, to overcome this frictional force, a larger motor must be provided to drive the spindles that engage the hubs.

The provision of flangeless hubs 30 and 32 being suspended or spaced from the upper and lower walls 12 and 14 of the cartridge housing 10 so the tape does not contact any flange or either wall 12, 14 or a liner, but contacts only the stationary guides 38, 40 also contributes to permitting the hubs running at high speeds since there is a minimum amount of frictional contact with the tape.

The provision of stationary guide posts 38 and 40 which are metal, so that a minimum amount of static charge is created when the tape 28 passes over the guides, and which have concave grooves with a surface roughness average of between 20 and 40 microinches, to aid in tracking of the tape to form a proper pack on the flangeless hubs 34 and 36 and to create an air bearing, also contributes to permitting the tape 28 and the hubs 30, 32 to run at very high speeds.

Using different brands of tape in the cartridge 10 described, top transport speeds of between 350 and 480 IPS have been successfully obtained. This compares to top speeds of about 140 IPS normally obtained with cartridges of the same size, While the invention has been described with reference to the structures disclosed, it is not confined to the specific details set forth, but is intended to cover such modifications or changes as may come within the scope of the following claims.

We claim:

1. A tape transport system comprising:
(a) a cassette housing having a top wall and a bottom wall;
(b) a pair of flangeless hubs rotatably mounted in said housing and each having an axis about which each rotates;
(c) a pair of rotatable spindles, one for each respective hub, each having an axis of rotation substantially parallel to the other and having a magnetic portion at its upper end, the center of which is substantially coincident with the spindle axis;
(d) each said hub having an opening therein extending in a generally axial direction of said hub and having its center substantially coincident with the hub axis;
(e) each said opening being closed at its respective upper end and being open at its respective lower end;
(f) the closed end of each said hub comprising magnetically attractive material at least in an area extending substantially across the entire said opening;
(g) each said spindle being received in a respective said hub opening;
(h) a drive connection between each said spindle and its respective said hub to impart rotation to said hub when said spindle rotates;
(i) coacting means on each said hub and its respective spindle for stabilizing the lower end of its respective hub against wobble when each hub and its respective spindle are rotating;
(j) said coacting means including registration means on said hub and said spindle so constructed and arranged relative to each other providing a contiguous but non engaging relationship between each said spindle magnetic portion and each said hub closed end area;
(k) the power of said magnetic portion of each said spindle being strong enough to attract said magnetically attractive closed end of its respective said hub toward said spindle and hold said hub against said spindle during all speeds of rotation thereof and yet permit removal of a respective said hub from said spindle without substantially jarring said hub;
(l) said magnetic attraction between said magnetic portion of each said spindle and said magnetically attractive closed end of its respective said hub being the sole force in a generally axial direction of each hub urging each hub into engagement with its respective spindle;

(m) said coacting means being located on each said spindle relative to said bottom wall of said cassette housing so as to suspend its respective said hub between said housing top and bottom walls whereby there is clearance between said top and bottom walls and said hubs;

(k) each of said hubs having a tape engagement portion having an axial dimension and which has a tape center line in a plane which is substantially perpendicular to the axes of said hubs and intersects each of said tape engagement portions at the center of its axial dimension; and (l) the tape center lines of each of said hubs being substantially in the same plane.

2. The structure as recited in claim 1 further comprising:

(a) said pair of flangeless hubs comprising a first flangeless hub located at one side of said housing and a second flangeless hub located at the opposite side of said housing than said first hub;

(b) said housing having an access opening located between said hubs;

(c) a first generally cylindrical guide member located between said top and bottom walls at one side of said opening on said one side of said housing;

(d) a second generally cylindrical guide member located between said top and bottom walls at the opposite side of said opening on said opposite side of said housing;

(e) each of said guide members having stationary flanges at both ends thereof and a stationary central grooved portion between said flanges;

(f) each of said guide members having an axis which extends in a direction transverse to said top and bottom walls;

(g) the rotational axes of said spindle and hub and the axes of said guide members being substantially parallel to each other;

(h) said grooved portion comprising concave grooves extending in a direction transverse to the axis of its respective said guide member and providing a surface roughness average between 20 and 40 microinches;

(i) a tape extending in a tape transport path from said first hub directly to and engaging said grooved central portion of said first guide member and across said opening directly to and engaging said grooved central portion of said second guide member and directly to said second hub;

(j) each of said guide members having a tape center line in a plane which is substantially perpendicular to the axes of said guide members and intersects each of said guide members at the center of said grooved central portion;

(k) the tape center lines of each of said guide members and each of said hubs being substantially in the same plane; and (l) said guide members being the sole members in said housing engaged by said tape in said tape transport path between said hubs.

3. A tape transport system comprising:

(a) a cassette housing having a top surface and a bottom surface;

(b) a pair of flangeless hubs rotatably mounted in said housing and each having an axis about which it rotates;

(c) a pair of rotatable spindles, one for each respective hub, each having an axis of rotation substantially parallel to the other and having a magnetic portion at its upper end, the center of which is substantially coincident with the spindle axis;

(d) each said rotatable spindle further having an axially extending generally annular outer surface at the lower end of said spindle and a generally annular shoulder transverse to the spindle axis and extending from the lower end of said axially extending generally annular outer surface;

(e) each said hub having an opening therein extending in a generally axial direction of said hub and having its center substantially coincident with the hub axis;

(f) each said opening being closed at its respective upper end and being open at its respective lower end (g) the closed end of each said hub comprising magnetically attractive material at least in an area extending substantially across the entire said opening;

(h) each said spindle being received in a respective said hub opening;

(i) a drive connection between each said spindle and its respective said hub to impart rotation to said hub when said spindle rotates;

(j) each said hub having, at its open end, a generally annular edge surface surrounding said opening transverse to the hub axis and in engagement with said generally annular shoulder of its respective said spindle;

(k) each said hub having, at its open end, a generally annular axially extending inner surface merging with said generally annular edge surface; said inner surface being contiguous with said axially extending generally annular outer surface of its respective said spindle;

(l) the axial distance between said shoulder of said spindle and the uppermost portion of said magnetic portion being less than the axial distance between said spindle shoulder and the lowermost portion of said magnetically attractive closed end area of said hub to form a contiguous but non engaging relationship between said spindle magnetic portion and said hub closed end area;

(m) the power of said magnetic portion of each said spindle being strong enough to attract said magnetically attractive closed end of its respective said hub toward said spindle and hold said hub against said spindle during all speeds of rotation thereof and yet permit removal of a respective said hub from said spindle without substantially jarring said hub;

(n) said magnetic attraction between said magnetic portion of each said spindle and said magnetically attractive closed end of its respective said hub being the sole force in a generally axial direction of each hub urging each hub into engagement with its respective spindle;

(o) the location of each said spindle shoulder relative to said bottom surface of said cassette housing being such to suspend its respective said hub between said housing top and bottom surfaces whereby there is clearance between said top and bottom surfaces and said hubs;

(p) each of said hubs having a tape engagement portion having an axial dimension and which has a tape center line in a plane which is substantially perpendicular to the axes of said hubs and intersects each of said tape engagement portions at the center of its axial dimension; and (q) the tape center lines of each of said hubs being substantially in the same plane.

4. The structure as recited in claim 3 wherein said generally annular outer surface of said spindle, said generally annular shoulder of said spindle, said generally annular edge surface of said hub and said generally annular axially extending inner surface of said hub are each circular.

5. The structure as recited in claim 3 further comprising:
   (a) said pair of flangeless hubs comprising a first flangeless hub located at one side of said housing and a second flangeless hub located at the opposite side of said housing than said first hub;
   (b) said housing having an access opening located between said hubs;
   (c) a first generally cylindrical guide member located between said top and bottom walls at one side of said opening on said one side of said housing;
   (d) a second generally cylindrical guide member located between said top and bottom walls at the opposite side of said opening on said opposite side of said housing;
   (e) each of said guide members having stationary flanges at both ends thereof and a stationary central grooved portion between said flanges;
   (f) each of said guide members having an axis which extends in a direction transverse to said top and bottom walls;
   (g) the rotational axes of said spindles and hubs and the axes of said guide members being substantially parallel to each other;
   (h) said grooved portion comprising concave grooves extending in a direction transverse to the axis of its respective said guide member and providing a surface roughness average between 20 and 40 microinches;
   (i) a tape extending in a tape transport path from said first hub directly to and engaging said grooved central portion of said first guide member and across said opening directly to and engaging said grooved central portion of said second guide member and directly to said second hub;
   (j) each of said guide members having a tape center line in a plane which is substantially perpendicular to the axes of said guide members and intersects each of said guide members at the center of said grooved central portion;
   (k) the tape center lines of each said guide members and each of said hubs being substantially in the same plane; and
   (l) said guide members being the sole members in said housing engaged by said tape in said tape transport path between said hubs.

* * * * *